T 859,009

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED FEBRUARY 4, 1969

859 O.G. 42

764,025

NON-FIBRILLATING POLYOLEFIN ARTICLE AND METHOD OF MAKING

Warner D. Long. Kingsport, Tenn., assignor to Eastman Kodak Company, Rochester, N.Y., a corporation of New Jersey

Continuation of application Ser. No. 440,596, Mar. 17, 1965. This application Sept. 20, 1968. Published Feb. 4, 1969

Class 24—16

No Drawing. 8 Pages Specification

A strap of a formable, organic, polymeric material which is substantially unilaterally oriented to give it longitudinal strength containing from about 2% to about 40% of a filler material which disrupts the unilateral orientation of the strap giving it sufficient transverse strength to prevent it from fibrillating when it is subjected to external forces. Such a strap is useful in packaging especially as a replacement for steel strapping.